United States Patent [19]

Makowski et al.

[11] 4,131,586

[45] Dec. 26, 1978

[54] POLYMERIC HYDROXYALKYL SULFONATES

[75] Inventors: Henry S. Makowski, Scotch Plains; Charles P. O'Farrell, Clark, both of N.J.

[73] Assignee: Exxon Research & Engineering Co., Florham Park, N.J.

[21] Appl. No.: 855,763

[22] Filed: Nov. 29, 1977

[51] Int. Cl.² ............................................. C08K 5/10
[52] U.S. Cl. ....................... 260/31.2 R; 260/DIG. 31; 260/823
[58] Field of Search ...................... 260/79.3 R, 31.2 R

[56] References Cited
U.S. PATENT DOCUMENTS 4,007,149  2/1977  Burton et al. ................... 260/29.7 B

*Primary Examiner*—Lewis T. Jacobs
*Attorney, Agent, or Firm*—Richard E. Nanfeldt

[57] ABSTRACT

Polymers having one or more sulfonic acid groups covalently bonded to one or more carbon atoms including the polymer are stabilized against thermal and hydrolytic degradation by reaction with an oxirane. The solid, gel-free hydroxyalkyl sulfonates thus formed are readily converted to thermoplastic ionomers by reaction with a metallic base or salt of a weak acid. The polymeric hydroxy alkylsulfonates possess a low melt viscosity and thus are readily mixed with neutralizing agents, plasticizers or other polymers and thereafter converted to ionomers by reaction with the neutralizing agent which is a metallic base or salt of a weak acid. The formulated solid gel-free ionomers are thermoelastic in nature and can be extruded, injected molded, and compression molded to useful products.

35 Claims, No Drawings

POLYMERIC HYDROXYALKYL SULFONATES

BACKGROUND OF THE INVENTION

1. Field of the Invention

This invention relates to processes for the thermal and hydrolytic stabilization of sulfonated polymers having one or more sulfonic acid groups covalently bonded to one or more carbon atoms in one or more molecules comprising the polymers. Most particularly, this invention relates to the reaction products of the sulfonated polymers with an oxirane to form a hydroxyalkyl ester of the sulfonic acid groups and the conversion, in whole or in part, of the ester to a solid, gel-free ionomer by the reaction of the reaction of the ester with a mono or polyvalent base, or salt of an acid having a lower $K_a$ than the sulfonic acid.

The hydroxyalkyl esters of this invention may be schematically represented as follows:

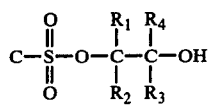

wherein C is one or more carbon atoms in one or more molecules comprising a polymer and is in the polymer backbone-chain of carbon atoms or is in an acyclic, alicyclic, or aromatic group which is pendant to the backbone chain; $R_1$, $R_2$, $R_3$ and $R_4$ are independently selected from the group consisting of hydrogen, $C_1$ to $C_{18}$ straight and branched chain acyclic, alicyclic, aryl, alkylaryl, arylalkyl groups and functional derivatives thereof.

Products which have a limited concentration of ionic groups covalently bonded to one or more carbon atoms of one or more molecules comprising a polymer, when partially or completely neutralized with mono or polyvalent cations such as sodium, zinc, magnesium, lead, ammonium, and quaternary ammonium compounds are generally referred to as ionomers. The ionic groups can be covalently bonded to carbon atoms comprising the backbone chain of the polymer, which chain of carbon atoms may be interrupted by hetero atoms such as oxygen, nitrogen and sulfur, or the ionic groups can be bonded to acyclic, alicyclic or aromatic groups which are pendant to the backbone chain. Ionomers differ from covalently corss-linked elastomers, such as vulcanized rubber, in that while ionomers can be elastomeric at ordinary temperatures, at elevated temperatures, they can be extruded, compression molded, blow molded, sheeted, vacuum formed and injection molded.

Sulfonated polymers are known to be relatively unstable and are difficult to process in safety or without degradation in conventional plastic or rubber equipment at elevated temperatures. Except for this tendency to degrade it would be advantageous to process the free acid since the weak ionic associations result in a low polymer viscosity permitting easy mixing with neutralizing agents, plasticizers, and other polymers. These systems can then be reacted with the neutralizing agent which is an amine or metallic or quaternary base such as an oxide or hydroxide or salt of a weak acid such as an acetate or stearate to yield the ionomer.

On the other hand, if the sulfonated polymer is first neutralized with a counterion and the ionomeric product isolated, it is found to possess an extraordinarily high viscosity even at elevated temperatures commonly used for processing thermoplastic polymers in conventional equipment and must be mixed with other materials by solution techniques.

A major object of this invention is the preparation of low viscosity, thermally and hydrolytically stable esters of sulfonated polymers which are readily convertible to solid, gel-free ionomers by reaction with a basic substance. A further object of this invention is the preparation of ionomers which comprises reacting a polymer having one or more sulfonic acid groups covalently linked or bonded to one or more carbon atoms in one or more molecules comprising said polymer with an oxirane to form a solid, gel-free hydroxyalkyl ester and reacting said ester with a basic substance selected from the group consisting of mono and polyvalent amines, quaternary ammonium oxides and hydroxides, and mono and polyvalent metallic oxides, hydroxides, alkoxides and salts of acids having a lower $K_a$ than the sulfonic acid. These, and other objects of this invention will be further apparent in the detailed description of the invention with follows below.

2. Prior Art

The reaction of an oxirane (e.g. ethylene oxide) with a sulfonic acid to form a hydroxyethyl ester is old in the art. U.S. Pat. No. 2,208,581 discloses the preparation of surface active agents by the reaction of low molecular weight sulfonic acids with a compound containing an olefin oxide.

In copending application concerning preparation of ionomeric latex epoxides are used to quench the sulfonation reaction and allow the cement to be processable in a unique latex process. However, this copending application fails to teach a method for the isolation of a solid, gel-free, hydrolytically stable polymeric hydroxy alkyl sulfonate having desirable physical and rheological properties, wherein these polymeric sulfonates are readily formable on conventional plastic type processing equipment in a variety of useful articles. Furthermore, it is completely unpredictable that a solid, gel-free, hydrolytically stable polymeric hydroxy alkyl sulfonate is capable of being isolated in a steam stripping operation under acidic conditions and at higher temperatures based upon the published literature on the hydrolytic stability of low molecular weight alkyl sulfonates. No references have been found in the chemical or patent literature for the preparation of hydroxylalkyl esters of polymeric sulfonic acids or for the preparation of ionomers from these esters by reaction with a basic compound or salt of an acid having a lower $K_a$ than the sulfonic acid.

SUMMARY OF THE INVENTION

This invention describes a process for the preparation of a solid, gel-free hydroxyalkyl esters of polymeric sulfonic acids having low melt viscosity and improved stability against deterioration by hydrolytic agents and elevated temperatures by the reaction of a polymer having one or more sulfonic acid groups covalently bonded to one or more carbon atoms comprising the polymer with an oxirane, and the conversion of the thus formed polymeric hydroxyalkyl ester to a solid, gel-free ionomer by the reaction of the ester with a basic compound.

DESCRIPTION OF THE PREFERRED EMBODIMENTS

Polymers having sulfonic acid groups covalently bonded to carbon atoms comprising the polymer can be prepared by the sulfonation of a pre-formed polymer, or by the interpolymerization of a monomer incorporating a sulfonic acid group. As used herein, the term "interpolymer" denotes a polymer comprising more than one species of monomer, e.g. copolymer, terpolyner, etc. in which the arrangement of the monomers in the polymer may be random, alternating, block, graft, stereoregular and the like.

Suitable non-limiting examples include:

1. Pre-Formed Polymers (a) Homopolymers and interpolymers of one or more acyclic and alicyclic mono-olefins in which the polymers are essentially free of unsaturation (except for chain-end unsaturation) prepared with the aid of cationic, free-radical, alkali metal anionic, or Ziegler-Natta catalysts. Non-limiting examples include homopolymers and interpolymers of $C_2$ to $C_{18}$ olefins such as ethylene, propylene, isobutene, butene-1, pentene-1, hexene-1, 4-methyl pentene-1, cyclopentene, bicyclo-(2,2,1) -heptene, dodecene-1 and octadecene-1. Commercially available polymers in this group include polyethylene, polypropylene and ethylene-propylene rubber (EPR).

(b) Homopolymers and interpolymers of one or more alkenyl aromatic hydrocarbon monomers and substituted derivatives thereof having the general formulae Ar—C(R)=CHR' and Ar—CHR—CH=CH$_2$ wherein Ar is a monovalent aromatic radical and R and R' are independently selected from the group consisting of hydrogen and a methyl radical. Non-limiting examples of monomers from which polymers can be obtained which are suitable for the practice of this invention include: styrene, -methyl styrene, propenyl benzene, allyl benzene, vinyl toluene, vinyl naphthalene and vinyl ethylbenzene.

(c) Interpolymers of one or more $C_4$ to $C_{10}$ conjugated diolefins with one or more $C_8$ to $C_{12}$ vinyl aromatic hydrocarbons. Non-limiting examples include: copolymers of 1,3-butadiene with styrene, copolymers of isoprene and tert-butyl styrene, and graft polymers of styrene on polybutadiene.

(d) Random interpolymers of one or more $C_8$ to $C_{12}$ vinyl aromatic hydrocarbons comprising about 40 to 60 wt. % of the vinyl aromatic with one or more $C_4$ to $C_{10}$ Type III monoolefins. Non-limiting examples include the interpolymers of styrene and isobutylene.

(e) Random elastomeric interpolymers of one or more $C_4$ to $C_{10}$ conjugated diolefins with one or more $C_4$ to $C_{10}$ Type III mono-olefins. Non-limiting examples include the family of Butyl rubbers comprising interpolymers of isobutylene with butadiene, isoprene, piperylene, 1,3-hexadiene, 2,3-dimethyl-1,3-butadiene and cyclopentadiene.

(f) Homopolymers and interpolymers of one or more $C_4$ to $C_{10}$ conjugated diolefins. Non-limiting examples of suitable monomers include: 1,3-butadiene; isoprene; piperylene; 2,3-dimethyl-1,3-butadiene; and cyclopentadiene. Enchainment, using a variety of catalysts for the polymerization, e.g. alkali metal anionic and Ziegler-Natta catalysts, includes 1,4-cis; 1,4-trans; 1,2- and 3,4- types of addition and random mixtures thereof. Non-limiting examples of commercially available polymers include: natural rubber and synthetic cis-1,4-polybutadiene and cis-1,4-polyisoprene.

(g) Random interpolymers of one or more Type I $C_2$ to $C_{18}$ mono-olefins and one or more $C_6$ to $C_{12}$ acyclic or alicyclic non-conjugated diolefins. Non-limiting examples of commerically available EPDM polymers include: terpolymers of ethylene, propylene and 1,4-hexadiene; terpolymers of ethylene, propylene and 5-ethylidene-2-norbornene and ethylene, propylene and dicyclopentadiene.

Olefin Types are in accordance with the Schmidt and Boord classification, J. Amer. Chem. Soc., 54, 751 (1932).

2. Polymers From Monomers Incorporating Sulfonic Acids

While the range and variety of monomers which incorporate sulfonic acid groups or their salts is not large at the present time, the use of these monomers permits the preparation of a variety of homopolymers and interpolymers that cannot be easily prepared by direct sulfonation of preformed polymers. Non-limiting examples of monomers incorporating sulfonic acids or their salts include: vinyl sulfonic acid; allyl sulfonic acid; 2-hydroxy-3-allyloxypropane sulfonic acid and styrene sulfonic acid. Vinyl sulfonic acid readily forms a water-soluble homopolymer and interpolymers with acrylonitrile, acrylamide, vinyl acetate, acrylic acid esters and N-vinyl pyrrolidone, using a variety of catalyst systems. Styrene sulfonic acid readily polymerizes to yield a water-soluble polymer. The above monomers are preferably interpolymerized with hydrocarbon monomers, e.g. styrene and 1,3-butadiene.

3. Sulfonation of Pre-Formed Polymers

Processes for the sulfonation of hydrocarbon polymers which are: (a) essentially free of olefinic unsaturation except for chain-end unsaturation, or (b) possess a measureable degree of olefinic unsaturation which may be in the polymer backbone chain of carbon atoms or is in an acyclic alkenyl or alkylidene radical or alicyclic radical which is pendant to the backbone chain of carbon atoms, or (c) possess aryl or arylene radicals which comprise the backbone chain of carbon atoms or are pendant to the backbone chain or carbon atoms are old in the art.

Polymers which are free of unsaturation but have a measure of chain branching such as polyethylene, polypropylene, and EPR rubbers may be sulfonated in solution by means of $SO_2$ and $O_2$ with the aid of a free-radical initiator, or sulfochlorinated in solution by means of $SO_2$ and $Cl_2$ with the aid of a free-radical initiator, followed by hydrolysis of the sulfonyl chloride to the free sulfonic acid or a salt of the sulfonic acid.

Complexes or coordination compounds of $SO_3$ with Lewis bases such as triethyl phosphate as disclosed in U.S. Pat. No. 3,205,285, which is herein incorporated by reference, have been extensively employed for the sulfonation of polymers. The same reagent has been disclosed in U.S. Pat. Nos. 3,072,618 and 3,072,619 for the sulfonation of polystyrene and in U.S. Pat. No. 3,432,480 for the sulfonation of cis-1,4-polybutadiene. The above three patents and U.S. Pat No. 3,642,728 which discloses a variety of complexing agents for the sulfonation of non-aromatic polymers such as Butyl rubber are hereby incorporated by reference. U.S. Pat. No. 3,836,511 which discloses the sulfonation of unsaturated elastomers using acetyl sulfate which is a preferred sulfonating agent, is also incorporated by reference. Suitable Lewis bases include cyclic ethers and thioethers, dialkyl formamides and hexaalkyl phosphoramides.

The sulfonations are carried out in solution in an inert hydrocarbon solvent such as hexane, heptane or isooctane, or chlorinated aliphatic solvents such as ethylene dichloride or aromatic solvents such as chlorobenzene at temperatures in the range of about −40° C. to 100° C. depending on the reactivity of the polymer and the sulfonation reagent that is employed.

Sulfonated polymers suitable for the practice of this invention may have elemental sulfur contents as high as 29.7 wt. % in the case of a homopolymer of vinyl sulfonic acid, or 28.1 wt. % in the case of a homopolymer of styrene sulfonic acid and as low as 0.1 wt. % in the case of a sulfonated polypropylene. Sulfonated elastomers such as Butyl rubber and EPDM rubbers are preferably sulfonated at a level to contain a sulfonic acid content in the range of about 5 to 100 meq./100g. polymer. The sulfonation reaction can be terminated and the sulfonated polymer converted to a hydroxyethyl ester by the addition of an oxirane to the reaction mixture, or the sulfonated polymer recovered by precipitation for example with a polar solvent such as methanol or acetone, and after removal of the polar solvent, redissolved in a non-reactive solvent and converted to the hydroxyalkyl ester by reaction with an oxirane.

4. Oxiranes

Oxiranes which are suitable for the practice of this invention have the general formula:

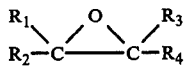

wherein $R_1$, $R_2$, $R_3$ and $R_4$ are independently selected from the group consisting of hydrogen and $C_1$ to $C_{18}$ straight and branched chain acyclic, alicyclic, aryl, alkylaryl, arylalkyl radicals and functional derivatives thereof. Nonlimiting examples of suitable oxiranes include ethylene oxide, propylene oxide, allyl glycidyl ether, styrene oxide, epichlorohydrin and epoxidized methyl oleate.

Ethylene glycol, propylene glycol and their monomethyl or monoethyl ethers are useful as their mono sodium or potassium salts for the preparation of the hydroxyethyl esters from polymers which have been chlorosulfonated.

5. Product Processes and Properties

In accordance with this invention, polymers having sulfonic acid groups covalently linked to carbon atoms comprising the polymer can be reacted with an oxirane to yield hydroxyalkyl esters which are free of acid and can be isolated as for example by steam stripping or precipitation with a polar solvent and the solid, gel-free product dried, mixed, compounded and the hydroxyalkyl sulfonate partially or completely converted to the metal sulfonate to form a solid, gel-free ionomer by mixing with a mono or polyvalent basic compound or salt of an acid having a lower $K_a$ than the sulfonic acid in conventional equipment without decomposition or corrosion. The hydroxyethyl esters are:

(1) Stable to hydrolysis under steam stripping conditions;
(2) Thermally stable at the temperatures used in processing thermoplastic and elastomeric materials;
(3) Convertible to an ionomer by mixing in bulk with a basic compound or salt of a weak acid, followed by the application of heat; and
(4) Permits the preparation of ionomers which are free of acid when less than the stoichiometric quantity, based on the sulfonic acid contents, of a basic compound or salt is used to convert the ester to an ionomer.

The hydroxyalkylated sulfonates and the neutralized sulfonated elastomeric polymer are gel-free. Gel is measured by stirring a given weight of polymeric hydroxalkyl sulfonate in a solvent comprised of 95 toluene-5-methanol at a concentration of 5 wt. %, for 24 hours, allowing the mixture to settle, withdrawing a weighed sample of the supernatant solution and evaporating to dryness.

The products and the process of this invention thus avoid all of the difficulties associated with working with the free acid or solution neutralized products.

The process comprises, in the case where preformed polymers listed above are used, in dissolving the polymer at a concentration in the range of about 3 to about 25 wt. % in a non-reactive solvent, sulfonating the polymer to the desired degree with an appropriate sulfonating agent, reacting the sulfonated polymer, either before isolation or after isolation and purification, in a solvent with an appropriate oxirane, separating the reaction product of the sulfonated polymer with the oxirane from the solvent and converting said reaction product to an ionomer by reaction with about 10 to more than 100% of the stoichiometric proportion of a metallic base or salt of an acid having a lower $K_a$ than the sulfonic, based on the sulfonic acid content of said sulfonated polymer, and recovering said ionomer.

The solid, gel-free hydroxyalkylated, sulfonated polymer is readily handled in drying extruders and conventional mixing equipment such as Banbury mixers and rubber mills. Compounding with neutralizing agents, plasticizers, antioxidants and other polymers is readily accomplished in such mixing equipment and the conversion of the compounded stock to an ionomer by the addition of bases such as mono and polyvalent metallic oxides, hydroxides and alkoxides, or salts of weak acids such as carboxylates of which acetates, laurates and stearates are non-limiting examples. Preferred are metal salts of carboxylic acids.

When a metal carboxylate is used to neutralize the polymeric sulfonic acid, a carboxylic acid is released.

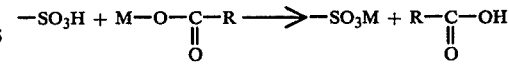

When the polymeric sulfonic acids are neutralized in bulk with the lower molecular weight metal carboxylates, the presence of the generated carboxylic acid, e.g. acetic acid, is undersirable because of odor and possible corrosion. The higher molecular weight carboxylic acids, such as stearic acid, are not odoriferous or corrosive. However, these higher molecular weight carboxylic acids, which are excellent flow improvers at elevated temperatures, also exert deleterious effects upon ionomer physical properties at lower temperatures and so are less desirable than other plasticizers.

The reaction between metal carboxylate and hydroxyalkyl sulfonate produces a mixture of the metal sulfonate and a hydroxyalkyl carboxylate ester in equal molar porportion for complete neutralization.

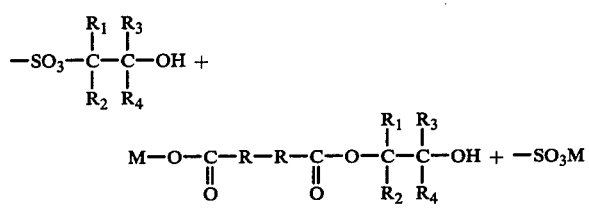

The lower molecular weight hydroxyalkyl carboxylates are not odoriferous or corrosive as the corresponding carboxylic acids. The higher molecular weight carboxylates are not as deleterious to physical properties as are the corresponding carboxylic acids.

The metals which are preferred for the formation of ionic crosslinks of the sulfonated polymer are selected from the group consisting of Groups I-A, II-A, I-B and II-B of the Periodic Table of Elements and lead, aluminum, iron and antimony. Most preferred are bases and fatty acid salts of zinc, magnesium, barium, sodium and lead.

The polymeric hydroxyalkyl sulfonate esters of this invention may be compounded with a wide variety of materials prior to conversion to an ionomer and include the usual materials used in the compounding of plastic and elastomers. Non-limiting examples include plasticizers, other elastomers, antioxidants, resins and plastic products.

Conversion of the uncompounded or compounded hydroxyethyl sulfonate by means of a metallic base or acylate is readily accomplished at elevated temperature, for example 120° C. to 260° C., most preferably, 150° C. to 200° C. These temperatures are readily obtainable in equipment used for processing plastic and elastomeric materials such as Banbury mixers and extruders. The solid, gel-free ionomers made by the bulk neutralization of the hydroxylakylated ester of the sulfonated polymer permits the formulation of compounds with excellent processability for extrusion, injection molding, vacuum forming, compression molding and similar operations. This invention also permits a polymer to be sulfonated at one site and shipped as the hydroxyalkyl ester in a stable, corrosion-free state to a formulator at another site who can then prepare a variety of ionomers best suited to a particular use.

EXAMPLE I — EPDM SULFONIC ACID

EPDM comprising 50 wt. % of ethylene, 45 wt. % of propylene and 5 wt. % of 5-ethylidene-2-norbornene having a Mooney viscosity (ML, 1 + 8, 212° F.) of about 20 was sulfonated as follows: to a well stirred solution of 500 grams of the polymer and 28.7 ml. of acetic anhydride in a 5.0 liters of hexane was slowly added 10.5 ml. of 95.5 wt. % (concentrated) sulfuric acid. The mixture was stirred at room temperature for 30 minutes and the sulfonation reaction terminated by the addition of 200 ml. of isopropanol containing 2.50 grams of Antioxidant 2246. The cement was steam stripped, the polymer washed with water in a Waring Blender and the crumb dewatered by banding on a rubber mill at about 40° C.

Samples of the sulfonated polymer, which previous work had shown was stable under vacuum at 60° C. for 24 hours, were placed in vacuum ovens maintained at 80° C. and 100° C. for 24 and 72 hours and the sulfur contents determined after heating with the following results.

TABLE I

| HEAT TREATMENT OF SULFONATED EPDM | | | |
|---|---|---|---|
| Sample No. | Temperature | Heating Time | Sulfur Content-Weight Percent |
| 1a | 80° C. | 24 hours | 1.00 |
| 1b | 80° C. | 72 hours | 0.92 |
| 1c | 100° C. | 24 hours | 0.78 |
| 1d | 100° C. | 72 hours | 0.64 |

The above results illustrate the deterioration and instability of sulfonated EPDM in the free-acid form when subjected to elevated temperature. While the loss in sulfur content is obvious, other forms of degradation also occur without a substantial loss of sulfur when the sulfonated polymer is heated.

EXAMPLE II — PROPYLENE OXIDE REACTION PRODUCTS (a) One hundred grams of the same EPDM used in Example I and 6.2 grams of acetic anhydride were dissolved in 1.0 liter of hexane and the EPDM sulfonated at room temperature by the slow addition of 2.10 ml. of concentrated sulfuric acid. After stirring for one-half hour, the reaction was terminated by the addition of 2.67 grams of propylene oxide.

(b) Example II(a) was repeated but 4.36 grams of propylene oxide was used to terminate the reaction. In each case, the hydroxypropyl ester cements appeared to have only slightly higher viscosities than the cements before esterification with the propylene oxide.

Each of the hydroxypropyl esters were recovered by steam stripping, washing and dewatering as in Example I. Five grams samples were converted to their sodium salts by titration in a warm solvent consisting of 95 volume percent of toluene and 5 volume percent of anhydrous methanol, with an 0.1 normal solution of ethanolic sodium hydroxide using alizarin-thymolphthalein indicator. Under the low temperatures used, reaction of the sodium hydroxide with the propyl ester was slow, the titrations requiring from 30 to 45 minutes until a stable end-point was reached. Run II(a) required 28 meq. of sodium hydroxide/100 grams and Run II(b), 29.4 meq./100 grams of polymer.

The above results illustrate the reistance of the hydroxypropyl esters of the sulfonated polymer to hydrolysis under the conditions encountered in recovering the esters by steam stripping and washing with water.

EXAMPLE III — THERMAL STABILITY OF HYDROXYPROPYL ESTERS AND PREPARATION OF IONOMERS FROM ESTERS

Ten gram samples of the hydroxypropyl esters prepared in Examples II(a) and II(b) were converted to ionomers by bulk compounding on a micro rubber mill with the stearates and acetates respectively of zinc, magnesium and barium. Test pads from each of the ionomers were molded at 150° C. for 30 minutes and 45 minutes and microtensile pads having a thickness of about 0.6 mm. and test specimens measuring 2.54 mm. in width and 12.7 mm. in length were cut from the pads and tensile strengths measured at 25° C. with an Instron TM Model instrument, using a pulling speed of about 51 mm. per minute. Samples of the uncompounded esters from Examples II(a) and II(b) were molded at 150° C.

for 30 minutes and at 177° C. for 15 minutes and tensile properties determined. For comparative purposes, a sample of the free acid was similarly molded and an ionomer prepared from the free acid by bulk neutralization with magnesium stearate. The results of the above tests are given in Table II below. It will be seen that the uncompounded esters prepared in Examples II(a) and II(b) when heated possessed little strengeh and on heating the only noticeable effect was a slight darkening in color. On the other hand, the free sulfonic acid darkened considerably and formed covalent crosslinks.

In addition to the physical data given in Table II, the experimental work in Examples II(a), II(b) and III showed that:

(1) In contrast to solution neutralized sulfonic acids which require from about 5 to about 10 volume percent addition of a polar solvent to maintain the ionomer in solution, no addition of a polar solvent is necessary to maintain the hydroxyalkyl ester in solution in the non-polar solvent used for the sulfonation reaction;

(2) The hydroxyalkyl esters of the polymer sulfonic acid are easily processed in conventional equipment;

(3) Addition of plasticizers are unnecessary, unless desired, to provide a workable viscosity; and (4) Various grades of end products can be prepared from a single hydroxyalkyl ester by varying the counterion, or using varying amounts of different counterions.

EXAMPLE IV - HYDROXYPHENETHYL ESTERS

Five hundred grams of a 20 Mooney EPDM, similar to that described in Example I, was sulfonated in the same manner as Example I and after stirring at room temperature for one-half hour, the reaction was terminated by the addition of 30.0 grams of styrene oxide. The viscosity of the cement increased markedly and was fairly high after standing for 15 minutes. 2.5 grams of Antioxidant 2246 was dissolved in the cement and the hydroxyphenethyl ester of the sulfonated EPDM recovered by steam stripping, washing with water in a Waring Blender and dried on a rubber mill at about 90° C. Analysis of a sample of the polymer showed a sulfur content of 0.99 wt. %.

Ionomers were prepared as in Example III from the ester by milling in the bulk with the acetates of barium, lead, sodium and magnesium and with magnesium stearate. The quantity of metallic salts added was on the basis of 90 meq. of metal per hundred grams of polymer.

Test pads were molded from the ester and the above ionomers for 15 minutes at 150° C. Micro dumbbells cut from the pads were tested for tensile strength, elongation and 300% modulus on the Instron TM tester and the results are given in Table III.

TABLE III

| Example Number | 4a | 4b | 4c | 4d | 4e | 4f | 4g |
|---|---|---|---|---|---|---|---|
| FORMULATION | | | | | | | |
| Polymer | 100 | 100 | 100 | 100 | 100 | 100 | 100 |
| Barium Acetate | — | 11.5 | — | — | — | — | — |
| Lead Acetate | — | — | 17.0 | — | — | — | — |
| Sodium Acetate . 3$H_2O$ | — | — | — | 12.0 | — | — | — |
| Magnesium Acetate . 4$H_2O$ | — | — | — | — | 9.5 | — | — |
| Zinc Acetate . 2$H_2O$ | — | — | — | — | — | 10.0 | — |
| Magnesium Stearate | — | — | — | — | — | — | 26.5 |
| MOLDED 15 min. at 150° C. | — | — | — | — | — | — | — |
| Tensile Strength, psi | 220 | 40 | 650 | 360 | 470 | 740 | 2210 |
| Elongation, % | >1000 | 775 | 500 | 465 | 360 | 480 | 570 |
| 300% Modulus, psi | — | 50 | 310 | 200 | 370 | 350 | 575 |

EXAMPLE V — ALLYLOXY HYDROXYPROPYL ESTER

Five Hundred grams of EPDM was sulfonated in the same manner as Example I and after stirring for one-half hour at room temperature, the reaction was terminated

TABLE II

| | Example 2a | | Example 2b | | Free Sulfonic Acid | |
|---|---|---|---|---|---|---|
| Base Polymer Compounded With[a] | Tensile Strength, psi | Elongation, % | Tensile Strength, psi | Elongation, % | Tensile Strength, psi | Elongation, % |
| No Compounding | | | | | | |
| 30 min. at 150° C. | 50 | 1050 | 80 | 1215 | 210 | 505 |
| 15 min. at 177° C. | 30 | 170 | 30 | 210 | 20 | 370 |
| Zinc Stearate | | | | | | |
| 30 min. at 150° C. | 1720 | 650 | 1700 | 630 | | |
| 45 min. at 150° C. | 640 | 470 | 1370 | 570 | | |
| Barium Stearate | | | | | | |
| 30 min. at 150° C. | 955 | 515 | 920 | 540 | | |
| 45 min. at 150° C. | 2230 | 580 | 1160 | 520 | | |
| Magnesium Stearate | | | | | | |
| 30 min. at 150° C. | 2510 | 610 | 2520 | 620 | 2030 | 600 |
| 45 min. at 150° C. | 1980 | 545 | 2130 | 560 | | |
| Zn(OOCCH$_3$)$_2$ . 2$H_2O$ | | | | | | |
| 30 min. at 150° C. | 740 | 420 | 930 | 480 | | |
| 45 min. at 150° C. | 1015 | 480 | 970 | 490 | | |
| Ba(OOCCH$_3$)$_2$ | | | | | | |
| 30 min. at 150° C. | 440 | 540 | — | — | | |
| 45 min. at 150° C. | 460 | 575 | 50 | 530 | | |
| Mg(OOCCH$_3$)$_2$ . 4$H_2O$ | | | | | | |
| 30 min. at 150° C. | 940 | 390 | 870 | 405 | | |
| 45 min. at 150° C. | 1395 | 470 | 1030 | 415 | | |

Note
[a]Compounding done on micro rubber mill with 10 grams of polymer and 9.0 meq. of metallic salts.

by the addition of 28.5 grams of allyl glycidyl ether. Some increase in the viscosity of the cement was noted.

The cement was stabilized by the addition of 2.5 grams of Antioxidant 2246 and the polymer recovered by steam stripping, washing with water in a Waring Blender and drying of the wet polymer crumb on a rubber mill at about 90° C. The polymer product had an elemental sulfur content of 0.96 wt. % which is equivalent to 30.0 meq. of sulfonate per 100 grams of polymer.

The allyloxyhydroxypropyl ester of the sulfonated EPDM was easily compounded on a rubber mill with 3 times the stoichiometric amount (i.e., 90 meq.) of the stearates of calcium, barium, aluminum, magnesium, lithium, zinc, lead and sodium. The formulations, molding conditions for the test pads and results obtained are given in Table IV.

TABLE IV

| Example Number | 5a | 5b | 5c | 5d | 5e | 5f | 5g | 5h |
|---|---|---|---|---|---|---|---|---|
| Formulation | | | | | | | | |
| Polymer | 100 | 100 | 100 | 100 | 100 | 100 | 100 | 100 |
| Calcium Stearate | 27.5 | — | — | — | — | — | — | — |
| Barium Stearate | — | 31.5 | — | — | — | — | — | — |
| Aluminum Stearate | — | — | 26.5 | — | — | — | — | — |
| Magnesium Stearate | — | — | — | 26.5 | — | — | — | — |
| Lithium Stearate | — | — | — | — | 26.0 | — | — | — |
| Zinc Stearate | — | — | — | — | — | 28.5 | — | — |
| Lead Stearate | — | — | — | — | — | — | 35.0 | — |
| Sodium Stearate | — | — | — | — | — | — | — | 27.5 |
| Molded 15 min at 150° C. | | | | | | | | |
| Tensile Strength, psi | 830 | 1260 | 270 | 1710 | 220 | 895 | 1880 | 350 |
| Elongation, % | 710 | 600 | >1500 | 670 | >1400 | 870 | 520 | 545 |
| 300% Modulus, psi | 170 | 310 | 95 | 340 | 70 | 170 | 470 | 240 |
| Molded 20 min. at 177° C. | | | | | | | | |
| Tensile Strength, psi | 1500 | 1820 | 760 | 3490 | 580 | 2310 | 4390 | 1470 |
| Elongation, % | 630 | 590 | 920 | 625 | 770 | 550 | 505 | 580 |
| 300% Modulus, psi | 180 | 220 | 140 | 380 | 130 | 300 | 590 | 310 |

TABLE V

| Example Number | 6a | 6b | 6c | 6d |
|---|---|---|---|---|
| Formulation: | | | | |
| Polymer | 100 | 100 | 100 | 100 |
| Magnesium Stearate | 17.7 | 26.5 | 35.5 | 44.5 |
| Molded 15 min. at 150° C. | | | | |
| Tensile strength, psi | 1340 | 1600 | 1840 | 2050 |
| Elongation, % | 620 | 610 | 650 | 665 |
| 300% Modulus, psi | 310 | 420 | 500 | 575 |

EXAMPLE VII — 2-HYDROXYETHYL ESTER

Five hundred grams of EPDM was sulfonated as in Example I and the sulfonation reaction terminated after 30 minutes and the 2-hydroxyethyl ester of the sulfonated polymer prepared by the addition of 11.0 grams of ethylene oxide to the reaction mixture. After stabilization with Antioxidant 2246, the ester product was recovered by steam stripping, washing and drying on a rubber mill. The product on analysis had a sulfur content of 1.02 wt. % which corresponds to 31.9 meq. of sulfonate per 100 grams.

The esterified polymer sulfonate was easily mixed on a cold rubber mill with 90 meq. per 100 grams of polymer with sodium laurate, magnesium laurate, sodium myristate, and magnesium stearate. Pads from the above gums were molded at 150° C. for 15 minutes. Formulations and test data on the above are given in Table VI.

EXAMPLE VI — 2-HYDROXY-3-CHLOROPROPYL ESTER

EPDM was sulfonated as in Example I and after stirring for one-half hour at room temperature, the reaction was terminated and the 2-hydroxy-3-chloropropyl ester of the polymer sulfonic acid prepared by the addition to the sulfonation reaction mixture of 23.1 grams of epichlorohydrin. After stabilization with Antioxidant 2246, the ester product was recovered by steam stripping, washing and drying. The polymer product showed on analysis a sulfur content of 0.98 wt. % of sulfur which corresponds to 30.6 meq. of sulfonate per 100 grams and a chlorine content of 1.01 wt. % which corresponds to 28.4 meq. of chlorine per 100 grams. The data show that essentially one mole of epichlorohydrin adds to each sulfonic acid group present in the polymer to form the hydroxyalkyl ester.

Ionomers were prepared from the ester on the rubber mill by mixing with 2, 3, 4 and 5 stoichiometric equivalents of magnesium stearate per equivalent of sulfonate. The results obtained on test pads molded at 150° C. for 15 minutes are given in Table V.

TABLE VI

| Example Number | 7a | 7b | 7c | 7d | 7e | 7f |
|---|---|---|---|---|---|---|
| Formulation: | | | | | | |
| Polymer | 100 | 100 | 100 | 100 | 100 | 100 |
| Sodium Laurate | — | 20 | — | — | — | — |
| Magnesium Laurate | — | — | 19 | — | — | — |
| Sodium Myristate | — | — | — | 20.5 | — | — |
| Magnesium Myristate | — | — | — | — | 21.5 | — |
| Magnesium Stearate | — | — | — | — | — | 26.5 |
| Molded 15 min at 150° C. | | | | | | |
| Tensile Strength, psi | 200 | 530 | 1030 | 490 | 1550 | 1610 |
| Elongation, % | >1000 | 480 | 580 | 570 | 590 | 550 |
| 300% Modulus, psi | — | 350 | 315 | 300 | 380 | 570 |

EXAMPLE VIII — 2-HYDROXYPROPYL ESTER

Five hundred grams of EPDM was sulfonated as in Example I and the sulfonation reaction terminated after 30 minutes and the 2-hydroxypropyl ester of the sulfonated polymer prepared by the addition of 14.5 grams of propylene oxide to the reaction mixture. Only a slight increase in the viscosity of the cement was noted. After stabilization of the polymer by the addition of 2.5 grams of Antioxidant 2246, the product was recovered and dried in the same manner as the previous examples.

The product had a sulfur content of 1.03 wt. % which corresponds to 32.2 meq. of sulfonate per 100 grams.

Mixing on a cold rubber mill of the ester product with 160 meq. of barium hydroxide and 90 meq. each of magnesium hydroxide, sodium benzoate and magnesium stearate per 100 grams of polymer occurred readily. Test pads of the above formulations were molded at 150° C. for 15 minutes and test results are given in Table VII.

TABLE VII

| Example Number | 8a | 8b | 8c | 8d |
|---|---|---|---|---|
| Formulation: | | | | |
| Polymer | 100 | 100 | 100 | 100 |
| Barium Hydroxide | 14.0 | — | — | — |
| Magnesium Hydroxide | — | 2.5 | — | — |
| Sodium Benzoate | — | — | 13.0 | — |
| Magnesium Stearate | — | — | — | 26.5 |
| Molded 15 min. at 150° C. | | | | |
| Tensile Strength, psi | 860 | 820 | 340 | 1660 |
| Elongation, % | 270 | 440 | 630 | 540 |
| 300% Modulus, psi | — | 480 | 150 | 560 |

EXAMPLE IX — MELT INDICES OF PRODUCTS

Sixty pounds of the EPDM used in Example I and 3.72 pounds of acetic anhydride were dissolved at room temperature in 396 pounds of hexane contained in a 100 gal. stainless-steel reactor fitted with an efficient stirrer. To the stirred solution was added over the course of 10 minutes, 2.32 pounds of concentrated sulfuric acid. After stirring for 30 minutes, the sulfonation reaction was terminated by the addition of 14.32 pounds of anhydrous methanol.

A sample of the cement was steam stripped, washed in a Waring Blender and the crumb dried to constant weight in a vacuum oven maintained at 40° C. and 8 torr. The dried polymer sulfonic acid had a sulfur content of 1.08 wt. % which corresponds to 33.9 meq. of sulfonic acid per 100 grams of dry polymer.

The remainder of the cement was neutralized with a solution of 3.94 pounds of zinc acetate dihydrate in 1.2 pounds of water and 23.88 pounds of methanol. 0.30 pounds of Antioxidant 2246 was added to the neutralized cement and the zinc ionomer recovered by steam stripping, washing and dewatering on a rubber mill at about 95° C.

The original unsulfonated EPDM; the hydroxyalkyl esters of the sulfonated polymer prepared in Examples IV, V, VI, VII and VIII; and the zinc salt prepared in Example IX were examined for their viscosity behavior using a melt index rheometer under conditions of constant shear stress ($10^6$ dynes/cm$^2$) at 150° C. with the exception of the zinc salt which was determined at a temperature of 190° C. Table VIII lists the results which were obtained. The values shown were determined from the initial melt index rheometer readings.

The results of the experimental work listed in Tables I to VIII show that:

(a) a variety of oxiranes including ones having selected functional derivatives are suitable for the preparation of the hydroxyalkyl esters of this invention;

(b) the esters are hydrolytically stable at steam stripping temperatures and are thermally stable at the temperatures conventionally used for processing plastic and elastomeric materials;

(c) the esters possess viscosities at processing temperatures which are considerably less than the viscosities of ionomers prepared by solution neutralization or metathesis; and (d) the esters are readily converted in the bulk to ionomers by simple mixing with a variety of metallic reagents which include hydroxides and a range of fatty and aromatic carboxylic acids, followed by molding at elevated temperature.

A range of physical properties in a cured ionomer may be obtained from a single sulfonated polymer by variation of the counterion compound used to convert the hydroxyalkyl sulfonate ester to an ionomer and variations in formulation.

What is claimed is:

1. A process for preparing a solid, gel-free ionomer which consists essentially of:

(a) reacting a polymer having one or more sulfonic acid groups covalently bonded to one or more carbon atoms in one or more molecules with an oxirane to form a polymeric hydroxyalkyl sulfonate said oxirane having the general formula:

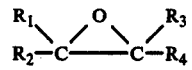

wherein $R_1$, $R_2$, $R_3$ and $R_4$ are independently selected from the group consisting of hydrogen and $C_1$ to $C_{18}$ straight and branched chain acyclic, alicyclic, aryl, alkylaryl, arylalkyl radicals and functional derivatives thereof;

(b) mixing said polymeric hydroxyalkyl sulfonate with a metallic salt of a fatty acid having a lower $K_a$ than an ionomer sulfonic acid groups, wherein said metallic salt is selected from the group consisting of antimony, hydroxyalkyl lead, aluminum and Groups I-A, I-B, II-A and II-B of the Periodic Table of Elements and mixtures thereof;

(c) heating the mixture of the polymeric hydroxyalkyl sulfonate and said metallic salt to a reaction temperature to form a mixture of anionomer and a hydroxyalkyl carboxylate ester, said ionomer being a metal neutralized sulfonated polymer and said hydroxyl carboxylate ester having the formula:

TABLE VIII

| Example Number | Epoxide | Temperature ° C. | Shear Rate sec$^{-1}$ | Viscosity Poise × $10^{-5}$ |
|---|---|---|---|---|
| Original Polymer | none | 150 | 21.5 | 0.47 |
| 4 | Styrene Oxide | 150 | 1.35 | 7.54 |
| 5 | Allyl Glycidyl Ether | 150 | 3.9 | 2.62 |
| 6 | Epichlorohydrin | 150 | 2.45 | 4.17 |
| 7 | Ethylene Oxide | 150 | 0.76 | 13.52 |
| 8 | Propylene Oxide | 150 | 0.64 | 16.00 |
| 9 | none | 190 | 0.26 | 43.09 |

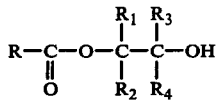

wherein said R, $R_1$, $R_2$, $R_3$, and $R_4$ are independently selected from the group consisting of hydrogen, $C_1$ to $C_{18}$ straight and branched chain acyclic, alicyclic, aryl, alkylaryl, and arylalkyl groups and functional derivatives thereof and mixtures thereof; and (d) recovering said mixture of said ionomer and said hydroxyalkyl carboxylate ester from said heated mixture.

2. A process of claim 1, wherein said polymer is selected from the group consisting essentially of:
   (a) homopolymers and interpolymers of one or more acyclic and alicyclic mono-olefins;
   (b) homopolymers and interpolymers of one or more alkenyl aromatic hydrocarbon monomers;
   (c) interpolymers of one or more $C_4$ to $C_{10}$ conjugated diolefins with one or more $C_8$ to $C_{12}$ vinyl aromatic hydrocarbons;
   (d) interpolymers of one or more $C_8$ to $C_{12}$ vinyl aromatic hydrocarbons with one or more $C_4$ to $C_{10}$ Type III mono-olefins;
   (e) elastomeric interpolymers of one or more $C_4$ to $C_{10}$ conjugated diolefins with one or more $C_4$ to $C_{10}$ Type III mono-olefins;
   (f) homopolymers and interpolymers of one or more $C_4$ to $C_{10}$ conjugated diolefins; and
   (g) interpolymers of one or more $C_2$ to $C_{18}$ Type I mono-olefins and one or more $C_6$ to $C_{12}$ acyclic and alicyclic non-conjugated diolefins.

3. The process of claim 1, wherein said polymer is Butyl rubber.

4. The process of claim 1, wherein said polymer is an EPDM terpolymer.

5. The process of claim 1, wherein said oxirane is ethylene oxide.

6. The process of claim 1, wherein said oxirane is propylene oxide.

7. The process for the preparation of an ionomer which consists essentially of:
   (a) dissolving a polymer selected from the group consisting of: random elastomeric interpolymers of one or more $C_4$ to $C_{10}$ conjugated diolefins with one or more $C_4$ to $C_{10}$ Type III mono-olefins; and random interpolymers of $C_2$ to $C_{18}$ Type I mono-olefins with one or more $C_6$ to $C_{12}$ acyclic or alicyclic non-conjugated diolefins in a solvent nonreactive to sulfuric acid;
   (b) sulfonating said polymer to contain a level of sulfonic acid in the range of about 10 to about 100 meq. $SO_3H$ per 100 grams of polymer with a sulfonation reagent comprising sulfuric acid or a coordination compound of sulfur trioxide;
   (c) reacting said sulfonated polymer in said solvent with an oxirane to give a sulfonated polymer-oxirane reaction product, said oxirane having the general formula:

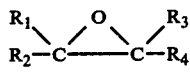

wherein $R_1$, $R_2$, $R_3$ and $R_4$ are independently selected from the group consisting of hydrogen and $C_1$ to $C_{18}$ straight and branched chain acyclic, alicyclic, aryl, alkylaryl, arylalkyl radicals and functional derivatives thereof;

(d) separating said reaction product from said solvent; and (e) mixing and heating said reaction product with from 0.1 to 10 stoichiometric equivalents, based on the sulfonic acid content of said sulfonated polymer, of a metallic salt of a fatty acid to form a metal neutralized sulfonated polymer and a hydroxyalkyl carboxylate ester having the general formula:

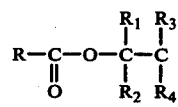

wherein R, $R_1$, $R_2$, $R_3$ and $R_4$ are independently selected from the group consisting of hydrogen and $C_1$ to $C_{18}$ straight and branched chain acyclic, alicyclic, aryl, alkylaryl, arylalkyl radicals and functional derivatives thereof, a metal of said salt being selected from the group consisting essentially of aluminum, lead, antimony, iron and Groups I-A, II-A, I-B and II-B of the Periodic Table of Elements and mixtures thereof.

8. The process according to claim 7, wherein said sulfonation reagent is a mixture of acetic anhydride and concentrated sulfuric acid in an inert solvent.

9. The process according to claim 7, wherein said interpolymer of said $C_4$ to $C_{10}$ conjugated diolefin and $C_4$ to $C_{10}$ Type III mono-olefin is Butyl rubber.

10. the process according to claim 7, wherein said interpolymer of said $C_2$ to $C_{18}$ Type I olefin and $C_6$ to $C_{12}$ non-conjugated diolefin is an EPDM elastomer.

11. The process according to claim 7, wherein said oxirane is ethylene oxide.

12. The process according to claim 7, wherein said oxirane is propylene oxide.

13. The process according to claim 7, wherein said metallic salt is magnesium stearate.

14. A solid, gel-free hydrolytically stable composition comprising the reaction product of a polymer having one or more sulfonic acid groups covalently linked to one or more carbon atoms in one or more molecules comprising said polymer with an oxirane.

15. Composition of claim 14, wherein said oxirane is ethylene oxide.

16. Composition of claim 14, wherein said oxirane is propylene oxide.

17. Composition of claim 14, wherein said polymer is selected from the group consisting essentially of:
   (a) homopolymers and interpolymers of one or more acyclic and alicyclic mono-olefins;
   (b) homopolymers and interpolymers of one or more alkenyl aromatic hydrocarbon monomers;
   (c) interpolymers of one or more $C_4$ to $C_{10}$ conjugated diolefins with one or more $C_8$ to $C_{12}$ vinyl aromatic hydrocarbons;
   (d) interpolymers of one or more $C_8$ to $C_{12}$ vinyl aromatic hydrocarbons with one or more $C_4$ to $C_{10}$ Type III mono-olefins;
   (e) elastomeric interpolymers of one or more $C_4$ to $C_{10}$ conjugated diolefins with one or more $C_4$ to $C_{10}$ Type III mono-olefins;
   (f) homopolymers and interpolymers of one or more $C_4$ to $C_{10}$ conjugated diolefins; and (g) interpolymers of one or more $C_2$ to $C_{18}$ Type I mono-olefins and one or more $C_6$ to $C_{12}$ acyclic and alicyclic non-conjugated diolefins.

18. A composition of claim 14, wherein said oxirane has the general formula:

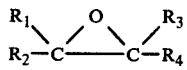

wherein $R_1$, $R_2$, $R_3$ and $R_4$ are independently selected from the group consiting of hydrogen and $C_1$ to $C_{18}$ straight and branched chain acyclic, alicyclic, aryl, alkylaryl, arylalkyl radicals and functional derivatives thereof.

19. Composition of claim 14, wherein said polymer is selected from the group consisting essentially of Butyl rubber or an EPDM terpolymer.

20. A solid, gel-free composition of matter which consists essentially of a mixture of:
(a) a metal neutralized sulfonated polymer, the sulfonate groups of said polymer being neutralized with a metal counterion selected from the group conisting of lead, iron, antimony, aluminum and Groups I-A, II-A, I-B, and II-B of the Periodic Table of Elements and mixtures thereof; and
(b) a hydroxyalkyl carboxylate ester having the formula:

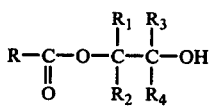

wherein $R_1$, $R_2$, $R_3$ and $R_4$ are independently selected from the group consisting of hydrogen, $C_1$ to $C_{18}$ straight and branched chain acyclic, alicyclic, aryl, alkylaryl, and arylalkyl groups and functional derivatives and mixtures thereof, said

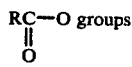

being derived from a metallic salt of a fatty acid.

21. A composition according to claim 20, wherein said oxirane is propylene oxide.

22. A process for preparing a solid, gel-free ionomer which consists essentially of:
(a) reacting a polymer having one or more sulfonic acid groups covalently bonded to one or more carbon atoms in one or more molecules with an oxirane to form a polymeric hydroxyalkyl sulfonate, said oxirane having the general formula:

wherein $R_1$, $R_2$, $R_3$ and $R_4$ are independently selected from the group consisting of hydrogen and $C_1$ to $C_{18}$ straight and branched chain acyclic, alicyclic, aryl, alkylaryl, arylalkyl radicals and functional derivatives thereof;
(b) mixing said polymeric hydroxyalkyl sulfonate with a metallic base having a lower $K_a$ than said sulfonic acid groups, wherein said metallic base is selected from the group consisting of antimony, iron, lead, aluminum and Groups I-A, II-A, I-B and II-B of the Periodic Table of Elements and mixtures thereof;
(c) heating the mixture of the polymeric hydroxyalkyl sulfonate and said metallic base to a reaction temperature to form said ionomer, said ionomer being a metal neutralized sulfonated polymer; and
(d) recovering said gel-free ionomer from said heated mixture.

23. A process of claim 22, wherein said polymer is selected from the group consisting essentially of:
(a) homopolymers and interpolymers of one or more acyclic and alicyclic mono-olefins;
(b) homopolymers and interpolymers of one or more alkenyl aromatic hydrocarbon monomers;
(c) interpolymers of one or more $C_4$ to $C_{10}$ conjugated diolefins with one or more $C_8$ to $C_{12}$ vinyl aromatic hydrocarbons;
(d) interpolymers of one or more $C_8$ to $C_{12}$ vinyl aromatic hydrocarbons with one or more $C_4$ to $C_{10}$ Type III mono-olefins;
(e) elastomeric interpolymers of one or more $C_4$ to $C_{10}$ conjugated diolefins with one or more $C_4$ to $C_{10}$ Type III mono-olefins;
(f) homopolymers and interpolymers of one or more $C_4$ to $C_{10}$ conjugated diolefins; and
(g) interpolymers of one or more $C_2$ to $C_{18}$ Type I mono-olefins and one or more $C_6$ to $C_{12}$ acyclic and alicyclic non-conjugated diolefins.

24. The process of claim 22, wherein said polymer is Butyl rubber.

25. The process of claim 22, wherein said polymer is an EPDM terpolymer.

26. The process of claim 22, wherein said oxirane is ethylene oxide.

27. The process of claim 22, wherein said oxirane is propylene oxide.

28. The product prepared by the process of claim 1.

29. The product prepared by the process of claim 7.

30. The product prepared by the process of claim 22.

31. A gel-free hydrolytically stable polymeric composition which consists essentially of a mixture of the reaction product of a hydroxyalkyl polymeric sulfonate and a metallic base, said hydroxyalkyl polymeric sulfonate being derived from the reaction product of a polymeric sulfonic acid and an oxirane having the general formula:

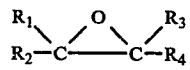

wherein $R_1$, $R_2$, $R_3$ and $R_4$ are independently selected from the group consisting of hydrogen and $C_1$ to $C_{18}$ straight and branched chain acyclic, alicyclic, aryl, alkylaryl, arylalkyl radicals and functional derivatives thereof, said metallic base having a metal ion selected from the group consisting of iron, lead, aluminum and Groups I-A, I-B, II-A and II-B of the Periodic Table of Elements and mixtures thereof.

32. The composition of claim 31 wherein said sulfonated polymer is derived from Butyl rubber.

33. The composition of claim 31, wherein said sulfonated polymer is derived from an EPDM terpolymer.

34. The process of claim 31, wherein said oxirane is ethylene oxide.

35. The process of claim 31, wherein said oxirane is propylene oxide.

* * * * *